United States Patent
Cong et al.

(10) Patent No.: US 10,587,470 B2
(45) Date of Patent: Mar. 10, 2020

(54) METHOD AND APPARATUS FOR PRESENTING STATUS OF STORAGE CLUSTER

(71) Applicant: EMC IP Holding Company LLC, Hopkinton, MA (US)

(72) Inventors: Honglei Cong, Shanghai (CN); Ryan Menglei Liang, Shanghai (CN); Mark Yue Qian, Shanghai (CN); Zhou Huang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 611 days.

(21) Appl. No.: 15/271,339

(22) Filed: Sep. 21, 2016

(65) Prior Publication Data

US 2017/0093629 A1 Mar. 30, 2017

(30) Foreign Application Priority Data

Sep. 25, 2015 (CN) .......................... 2015 1 0664336

(51) Int. Cl.
*G06F 15/16* (2006.01)
*H04L 12/24* (2006.01)

(52) U.S. Cl.
CPC ...... *H04L 41/0816* (2013.01); *H04L 41/0866* (2013.01)

(58) Field of Classification Search
CPC .. H04L 41/0816; H04L 41/0866; H04L 12/24
See application file for complete search history.

(56) References Cited

U.S. PATENT DOCUMENTS

| | | | | |
|---|---|---|---|---|
| 6,564,252 B1* | 5/2003 | Hickman | ............. | G06F 9/5061 709/214 |
| 8,271,556 B1* | 9/2012 | Shekar | ................... | H04L 41/12 707/821 |
| 2005/0015460 A1* | 1/2005 | Gole | ...................... | H04L 29/06 709/213 |
| 2006/0004909 A1* | 1/2006 | Takuwa | ............. | H04L 41/0816 709/203 |
| 2012/0254284 A1* | 10/2012 | Tamura | ................ | G06F 11/301 709/202 |
| 2012/0284395 A1* | 11/2012 | Miyashita | ........... | H04L 41/0816 709/224 |
| 2012/0303807 A1* | 11/2012 | Akelbein | ............ | G06F 11/3006 709/224 |
| 2012/0311566 A1* | 12/2012 | Takaoka | ............. | H04L 41/5035 718/1 |

(Continued)

FOREIGN PATENT DOCUMENTS

| | | |
|---|---|---|
| CN | 101778017 | 7/2010 |
| CN | 101815013 | 8/2010 |

(Continued)

*Primary Examiner* — Razu A Miah
(74) *Attorney, Agent, or Firm* — BainwoodHuang (57) ABSTRACT

Various embodiments of the present disclosure provide a method for presenting a storage cluster status, comprising: in response to a request for monitoring a first target node in a storage cluster, monitoring whether a configuration status of the first target node is changed; and in response to the configuration status of the first target node being changed, presenting changed configuration status information of the first target node to the user.

16 Claims, 4 Drawing Sheets

(56) References Cited

U.S. PATENT DOCUMENTS

| | | | | |
|---|---|---|---|---|
| 2012/0317253 A1* | 12/2012 | Maekawa | H04L 41/0816 | 709/221 |
| 2013/0042003 A1* | 2/2013 | Franco | H04L 67/1097 | 709/226 |
| 2013/0144766 A1* | 6/2013 | Suzuki | G06Q 30/0278 | 705/27.1 |
| 2013/0204980 A1* | 8/2013 | Wesby | G06Q 40/00 | 709/219 |
| 2013/0290399 A1* | 10/2013 | Gordon | H04L 67/1097 | 709/201 |
| 2013/0290529 A1* | 10/2013 | Gordon | H04L 67/1097 | 709/224 |
| 2014/0115153 A1* | 4/2014 | Kim, II | H04L 41/0816 | 709/224 |
| 2014/0289414 A1* | 9/2014 | Chan | G06F 9/54 | 709/226 |
| 2014/0344458 A1* | 11/2014 | Lee | H04L 47/125 | 709/226 |
| 2014/0359058 A1* | 12/2014 | Karnawat | H04L 67/1097 | 709/217 |
| 2015/0051942 A1* | 2/2015 | Franco | H04L 67/1097 | 705/7.25 |
| 2015/0081854 A1* | 3/2015 | Billore | H04L 41/0816 | 709/220 |
| 2015/0117258 A1* | 4/2015 | Kim | H04L 41/0816 | 370/254 |
| 2015/0163096 A1* | 6/2015 | Lee | G06Q 50/10 | 709/221 |
| 2015/0263917 A1* | 9/2015 | Liu | H04L 41/0816 | 709/224 |
| 2016/0043920 A1* | 2/2016 | Makino | H04L 41/0866 | 709/224 |

FOREIGN PATENT DOCUMENTS

| | | | |
|---|---|---|---|
| CN | 104601647 | 5/2015 | |
| EP | 2871578 | 5/2015 | |
| EP | 2871578 A1 * | 5/2015 | H04L 12/44 |

* cited by examiner

METHOD AND APPARATUS FOR PRESENTING STATUS OF STORAGE CLUSTER

RELATED APPLICATION

This application claim priority from Chinese Patent Application Number CN201510664336.2, filed on Sep. 25, 2015 at the State Intellectual Property Office, China, titled "METHOD AND APPARATUS FOR PRESENTING STATUS OF STORAGE CLUSTER," the contents of which is herein incorporated by reference in its entirety.

FIELD OF THE INVENTION

Various embodiments of the present disclosure relate to the field of data storage, and more specifically to a method and an apparatus for presenting a storage cluster status.

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY OF THE INVENTION

In view of one or more of the above and other potential problems, various embodiments of the present disclosure provide a method and an apparatus for presenting a storage cluster status.

According to a first aspect of the present disclosure, there is provided a method for presenting a storage cluster status, comprising: in response to a request for monitoring a first target node in a storage cluster, monitoring whether a configuration status of the first target node is changed; and in response to the configuration status of the first target node being changed, presenting changed configuration status information of the first target node to the user.

BRIEF DESCRIPTION OF THE ACCOMPANYING DRAWINGS

Through more detailed depiction of the exemplary embodiments of the present disclosure in conjunction with the accompanying drawings, the above and other objectives, features and advantages of the present disclosure will become more apparent, wherein in the exemplary embodiments of the present disclosure, same reference numerals generally represent same components.

DETAILED DESCRIPTION OF THE PREFERRED EMBODIMENTS

Hereinafter, preferred embodiments of the present disclosure will be described in more detail with reference to the accompanying drawings. Although the accompanying drawings show preferred embodiments of the present disclosure, it should be understood that the present disclosure may be implemented in various manners and should not be limited by the embodiments illustrated here. On the contrary, these embodiments are provided for making the present disclosure more thorough and complete, and conveying the scope of the present disclosure more completely to those skilled in the art.

Typically, Storage system providers usually provide their dedicated applications for storage cluster management, such as storage synchronization management, monitoring. Generally, If a failure occurs in a storage cluster, the storage cluster management application will detect the failure and fail over an active storage system to a backup system.

Traditionally, The cluster management application may provide various kinds of user interfaces, including GUI (graphical user interface), CLI (command line interface) or web. Generally, A method of managing a storage cluster is usually based on a command line or a web/http interface. Conventionally, If the user intends to query storage cluster information, the user needs to remotely execute the command line or send an http request with a program, and then parse the command line output or http response. For example, a storage driver in the OpenStack uses the command line to query storage information.

Generally, methods of managing a storage cluster have the following problems. Typically, a storage system failure in the storage cluster can only be detected by constantly keeping transmitting a query request. However, generally, high-frequency query of the storage system brings extra burden on the storage system. Besides, traditionally, each storage system in the storage cluster individually provides its own configuration/status information, such that when querying information of the storage system, the query can only be performed individually on each storage system, which is adverse to the query operation.

In view of one or more of the above and other potential problems, various embodiments of the present disclosure provide a method and an apparatus for presenting a storage cluster status.

According to a first aspect of the present disclosure, there is provided a method for presenting a storage cluster status, comprising: in response to a request for monitoring a first target node in a storage cluster, monitoring whether a configuration status of the first target node is changed; and in response to the configuration status of the first target node being changed, presenting changed configuration status information of the first target node to the user.

In one embodiment of the present disclosure, the method further comprises: in response to the configuration status of the first target node being changed, storing the changed configuration status information of the first target node in a configuration database.

In one embodiment of the present disclosure, the configuration database is configured to store the configuration status information of all nodes in the storage cluster.

In one embodiment of the present disclosure, the configuration status information stored in the configuration database is organized in a tree-like structure.

In one embodiment of the present disclosure, the method further comprises: in response to a request for querying a second target node in the storage cluster, returning configuration status information of the second target node; and presenting the configuration status information of the second target node to the user.

In one embodiment of the present disclosure, monitoring whether a configuration status of the first target node is changed further comprises monitoring whether the first target node fails, and the method further comprises: in response to failure of the first target node, presenting failure status information of the first node to the user.

In one embodiment of the present disclosure, the method further comprises: in response to failure of the first target node, failing over an active system where the first target node is located to a backup system.

According to a second aspect of the present disclosure, there is provided an apparatus for presenting a storage cluster status, comprising: a monitoring unit configured to, in response to a request for monitoring a first target node in a storage cluster, monitor whether a configuration status of the first target node is changed; and a displaying unit configured to, in response to the configuration status of the first target node being changed, present changed configuration status information of the first target node to the user.

In one embodiment of the present disclosure, the apparatus further comprises: a configuration database configured to, in response to the configuration status of the first target node being changed, store the changed configuration status information of the first target node.

In one embodiment of the present disclosure, the configuration database is configured to store the configuration status information of all nodes in the storage cluster.

In one embodiment of the present disclosure, the configuration status information stored in the configuration database is organized in a tree-like structure.

In one embodiment of the present disclosure, the apparatus further comprises: a query unit configured to in response to a request for querying a second target node in the storage cluster, return configuration status information of the second target node; and the displaying unit is further configured to present the configuration status information of the second target node to the user.

In one embodiment of the present disclosure, the monitoring unit is further configured to monitor whether the first target node fails, and the displaying unit is further configured to: in response to failure of the first target node, present failure status information of the first node to the user.

In one embodiment of the present disclosure, the apparatus further comprises: a failover unit configured to, in response to failure of the first target node, fail over an active system where the first target node is located to a backup system.

According to a third aspect of the present disclosure, there is provided a computer readable storage medium. The computer-readable storage medium has computer-readable program instructions stored thereon for executing steps of the method described above.

It will be understood through the following description that according to the embodiments of the present disclosure, when a configuration status of a target node in a storage cluster is changed, the changed configuration status information can be initiatively pushed to the user, such that the user can clearly understand changes of nodes in the storage cluster. Besides, by presenting the information about all storage systems in the storage cluster in a naming space, the information of all storage systems can be conveniently queried.

Figure 1:
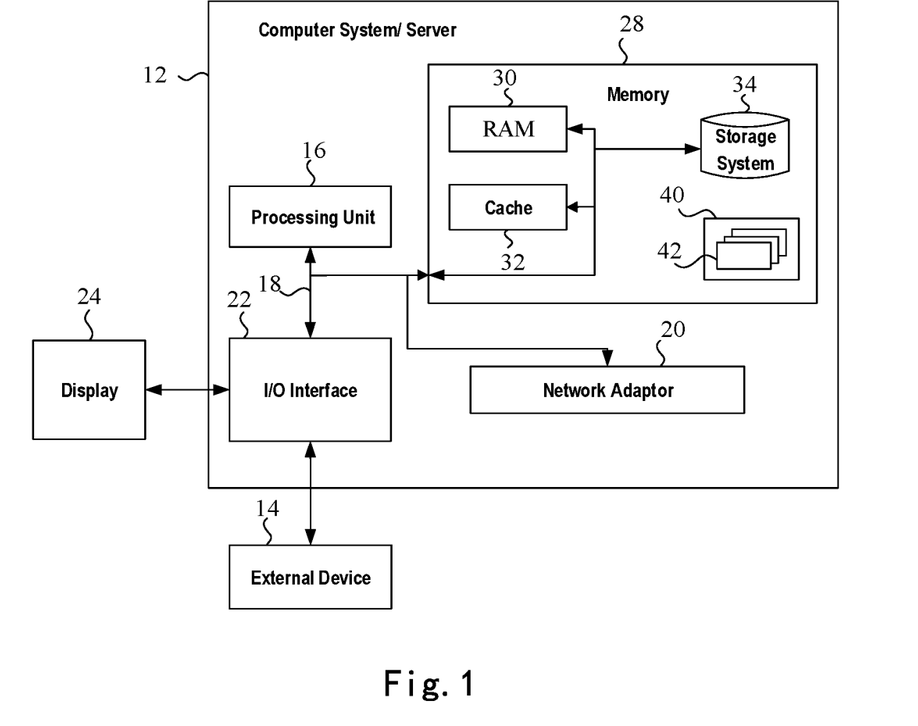
FIG. 1 illustrates a block diagram of an exemplary computer system/server adapted to implement the embodiments of the present disclosure.

FIG. 1 shows a block diagram of an exemplary computer system/server 12 adapted to implement the embodiments of the present disclosure. The computer system/server 12 as shown in FIG. 1 is only an example, which should not bring any limitation to the functions and scope of use of the embodiments of the present disclosure.

As shown in FIG. 1, the computer system/server 12 is embodied in a manner of a general computing device. Components of the computer system/server 12 may include, but not limited to: one or more processors or processing units 16, a system memory 28, a bus 18 for connecting different system components (including the system memory 28 and the processing unit 16).

The bus 18 indicates one or more of several bus structures, including a memory bur or a memory controller, a peripheral bus, an accelerated graphics port, a processor, or a local area bus using any bus structure in a variety of bus structures. For example, these hierarchical structures include, but not limited to, an Industry Standard Architecture (ISA) bus, a Micro Channel Architecture (MCA) bus, an enhanced ISA bus, a Video Electronics Standards Association (VESA) local area bus, and a Peripheral Component Interconnect (PCI) bus.

The computer system/server 12 typically comprises a plurality of computer system readable mediums. These mediums may be any available medium that can be accessed by the computer system/server 12, including volatile and non-volatile mediums, mobile and immobile mediums.

The system memory 28 may comprise a computer system readable medium in a form of a volatile memory, e.g., a random access memory (RAM) 30 and/or a cache 32. The computer system/server 12 may further comprise other mobile/immobile, volatile/non-volatile computer system storage medium. Only as an example, the storage system 34 may be used for reading/writing immobile and non-volatile magnetic mediums (not shown in FIG. 1, generally referred to as "hard-disk driver"). Although not shown in FIG. 1, a disk driver for reading/writing a mobile non-volatile disk (e.g., "floppy disk") and an optical disk driver for reading/writing a mobile non-volatile optical disk (e.g., CD-ROM, DVD-ROM or other optical medium) may be provided. In these cases, each driver may be connected to the bus 18 via one or more data medium interfaces. The memory 28 may include at least one program product that has a set of program modules (e.g., at least one). These program modules are configured to perform functions of various embodiments of the present disclosure.

A program/utility tool 40 having a set of program modules 42 (at least one) may be stored in for example the memory 28. This program module 42 includes, but not limited to, an operating system, one or more applications, other program modules, and program data. Each or certain combination in these examples likely includes implementation of a network environment. The program module 42 generally performs the functions and/or methods in the embodiments as described in the present disclosure.

Dependent on the needs, the computer system/server 12 may also communicate with one or more external devices (e.g., a display 24, an external device 14, etc.), and may also communicate with one or devices that cause the user to interact with the computer system/server 12, and/or communicate with any device (e.g., a network card, a modem, etc.) that causes the computer system/server 12 to communicate with one or more other computing devices. This communication may be carried out through an input/output (I/O) interface 22. Moreover, the computer system/server 12 may also communicate with one or more networks (e.g., a local area network (LAN), a wide area network (WAN) and/or a public network, e.g., Internet) via a network adaptor 20. As shown in the figure, the network adaptor 20 communicates with other modules of the computer system/server 12 via the bus 18. It should be understood that although not shown in the figure, other hardware and/or software modules may be used in conjunction with the computer system/server 12, including, but not limited to: microcode, device driver, redundancy processing unit, external disk drive array, RAID system, magnetic tape driver, and data backup storage system, etc.

In the depiction of the exemplary embodiments, the term "comprise" and its similar expressions represent an open inclusion, i.e., "including, but not limited to." The term "based on" represents "at least partially based on." The term "one embodiment" or "the embodiment" represents "at least one embodiment."

Hereinafter, the embodiments of the present disclosure will be described in detail. It will be understood through the depiction below that one of the basic ideas of the present disclosure is to initiatively push changed configuration status information to the user when a configuration status of the target node in the storage cluster is changed, such that the user can clearly understand the change of node status in the storage cluster.

Figure 2:
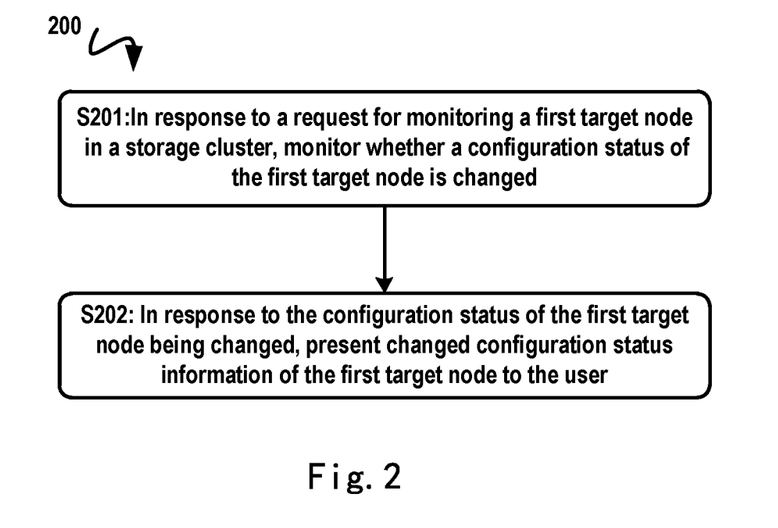
FIG. 2 illustrates a flow diagram of a method for presenting a storage cluster status according to the embodiments of the present disclosure.

FIG. 2 illustrates a flow diagram of a method 200 for presenting a storage cluster status according to the embodiments of the present disclosure. It should be understood that the method 200 may also comprise additional steps and/or omit the illustrated steps. The scope of the present disclosure is not limited in this aspect.

As shown in FIG. 2, in step S201, in response to a request for monitoring a first target node in a storage cluster, it is monitored whether a configuration status of the first target node is changed; and in step S202, in response to the configuration status of the first target node being changed, changed configuration status information of the first target node is presented to the user. Presenting the changed configuration status information of the first target node to the user, for example, may be implemented by initiatively notifying the changed configuration status information to the user.

In one embodiment of the present disclosure, the method above further comprises: in response to the configuration status of the first target node being changed, storing the changed configuration status information of the first target node in a configuration database.

In one embodiment of the present disclosure, the configuration database is configured to store the configuration status information of all nodes in the storage cluster.

Figure 3:
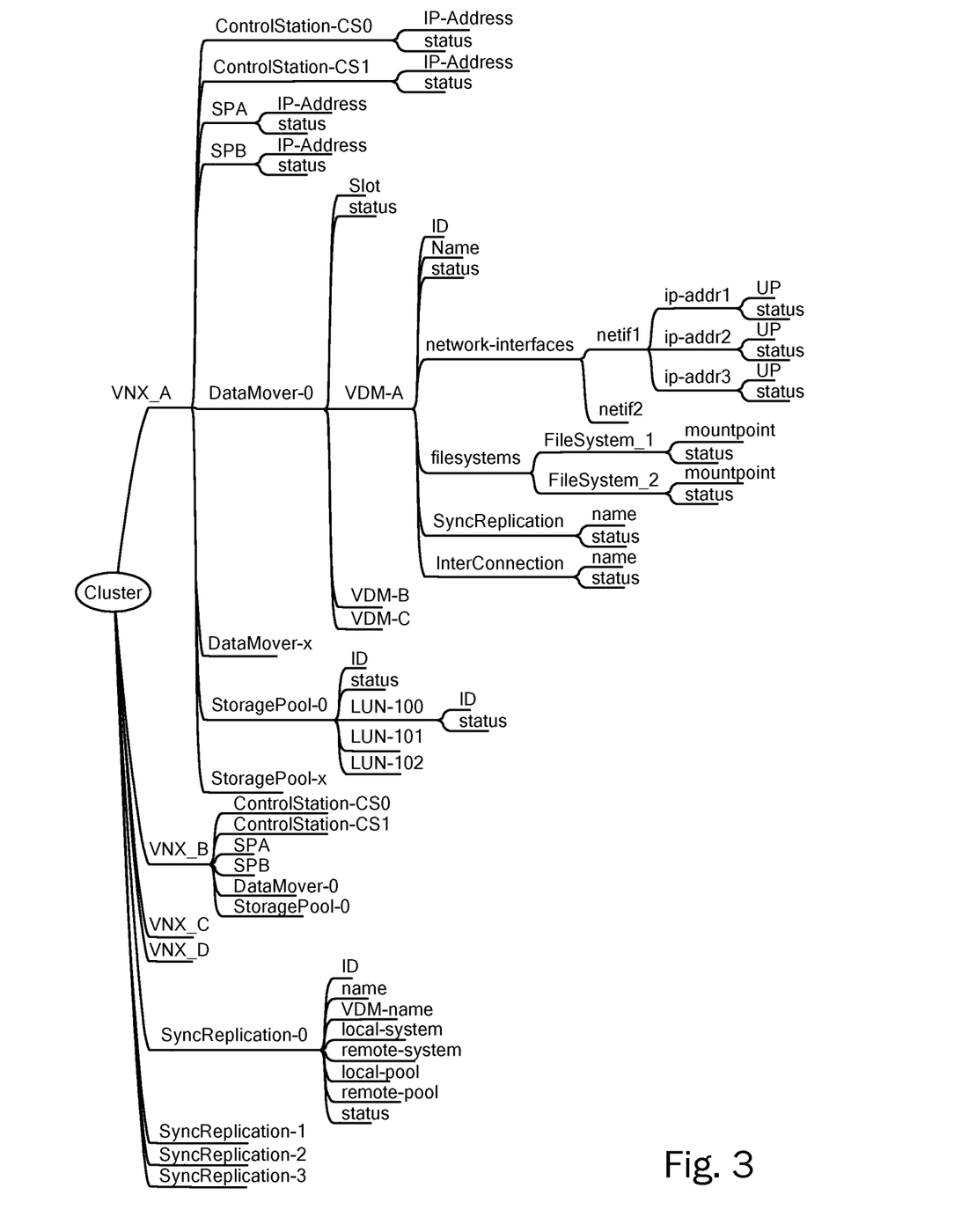
FIG. 3 illustrates a schematic diagram of a tree-like structure of a configuration database according to an exemplary embodiment of the present disclosure.

In one embodiment of the present disclosure, the configuration status information stored in the configuration database is organized in a tree-like structure. FIG. 3 illustrates a schematic diagram of a tree-like structure of a configuration database according to the exemplary embodiments of the present disclosure. As illustrated in FIG. 3, the configuration status information of all nodes in the storage cluster Cluster is stored in the configuration database using a hierarchical tree-like structure. By presenting the information of all storage systems in the storage cluster in a naming space, the information of all storage systems can be conveniently queried.

In one embodiment of the present disclosure, the method further comprises: in response to a request for querying a second target node in the storage cluster, returning configuration status information of the second target node; and presenting the configuration status information of the second target node to the user. The first target node and the second target node may be identical or different nodes.

In one embodiment of the present disclosure, monitoring whether a configuration status of the first target node is changed further comprises monitoring whether the first target node fails, and the method further comprises: in response to failure of the first target node, presenting failure status information of the first node to the user.

In one embodiment of the present disclosure, the method further comprises: in response to failure of the first target node, failing over an active system where the first target node is located to a backup system.

Hereinafter, a part of codes for implementing the method of presenting a storage cluster status will be provided below.

```
Operation GET:
Arguments:
    {
        "ACTION": "GET",
        "PATH": "PATH in namespace, entity separated by '/'"
    }
Results:
    {
        "RESULT": err-code, 0 means SUCCEEDED
        "OUTPUT": {JSON encoded node information}
    }
Operation WATCH:
Arguments:
    {
        "ACTION": "WATCH"
        "PATH": "PATH in namespace, entity separated by '/'"
    }
Results:
    {
        "RESULT": err-code, 0 means SUCCEEDED
        "OUTPUT": { }
    }
Operation NOFITY:
Arguments:
    {
        "ACTION": "NOTIFY"
        "PATH": "PATH in namespace, entity separated by '/'"
        "OUTPUT": {JSON encoded node information}
    }
No result.
```

The GET operation corresponds to a query operation in the method, for returning the configuration status information of the second target node in response to the query request for the second target node in the storage cluster. When performing the GET operation, the configuration status information of the second target node is queried via a path designated by the node in the storage cluster.

The WATCH operation corresponds to a monitoring operation in the method above, for monitoring whether the configuration status of the first target node is changed in response to a monitoring request for the first target node of the storage cluster. When performing the WATCH operation, the configuration status of the first target node is monitored via a path designated by the node in the storage cluster.

The NOTIFY operation corresponds to the notifying operation in the method above. When the first target node is monitored, if the configuration status of the first target node is changed, the changed configuration status information of the first target node is presented to the user.

An exemplary method of presenting a storage cluster status according to the embodiments of the present disclosure has been described above with reference to FIG. 2. Various steps of the method may be performed by a computing device that runs the file system. The computing device may be for example the computing device as shown in FIG. 1.

The spirit and principle of the present disclosure has been illustrated above with reference to several preferred embodiments. In various embodiments of the present disclosure, when a configuration status of a target node in a storage cluster is changed, the changed configuration status information can be initiatively pushed to the user, such that the user can clearly understand changes of nodes in the storage cluster. Besides, by presenting the information about all storage systems in the storage cluster in a naming space, the information of all storage systems can be conveniently queried.

Figure 4:
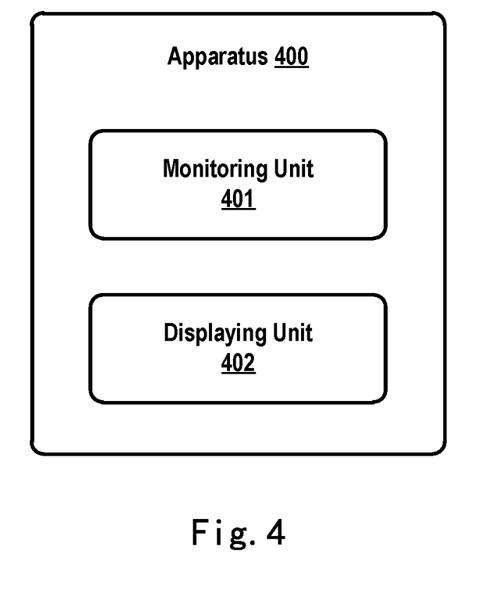
FIG. 4 illustrates a block diagram of an apparatus for presenting a storage cluster status according to the embodiments of the present disclosure.

FIG. 4 illustrates a block diagram of an apparatus 400 for presenting a storage cluster status according to the embodiments of the present disclosure.

As shown in FIG. 4, the apparatus 400 for presenting a storage cluster status comprises: a monitoring unit 401 configured to, in response to a request for monitoring a first target node in a storage cluster, monitor whether a configuration status of the first target node is changed; and a displaying unit 402 configured to, in response to the configuration status of the first target node being changed, present changed configuration status information of the first target node to the user.

In one embodiment of the present disclosure, the apparatus 400 further comprises a configuration database configured to, in response to the configuration status of the first target node being changed, store the changed configuration status information of the first target node.

In one embodiment of the present disclosure, the configuration database is configured to store the configuration status information of all nodes in the storage cluster.

In one embodiment of the present disclosure, the configuration status information stored in the configuration database is organized in a tree-like structure.

In one embodiment of the present disclosure, the apparatus 400 further comprises a query unit. The query unit may be configured to, in response to a request for querying a second target node in the storage cluster, return configuration status information of the second target node. The displaying unit 402 may be further configured to present the configuration status information of the second target node to the user.

In one embodiment of the present disclosure, the monitoring unit 401 is further configured to monitor whether the first target node fails. The displaying unit 402 is further configured to, in response to failure of the first target node, present failure status information of the first node to the user.

In one embodiment of the present disclosure, the apparatus 400 further comprises a failover unit. The failover unit is configured to, in response to failure of the first target node, fail over an active system where the first target node is located to a backup system.

It may be seen that the apparatus 400 may implement the method shown in FIG. 2, and although not shown further, the apparatus 400 may comprise more functional units to implement a plurality of embodiments described with reference to the method 200 of FIG. 2.

It should be noted that for the sake of clarity, FIG. 4 does not show optional units or sub-units included in the apparatus 400. All features and operations as described above are suitable for apparatus 400, respectively. Moreover, partitioning of units or subunits in apparatus 400 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Figure 5:
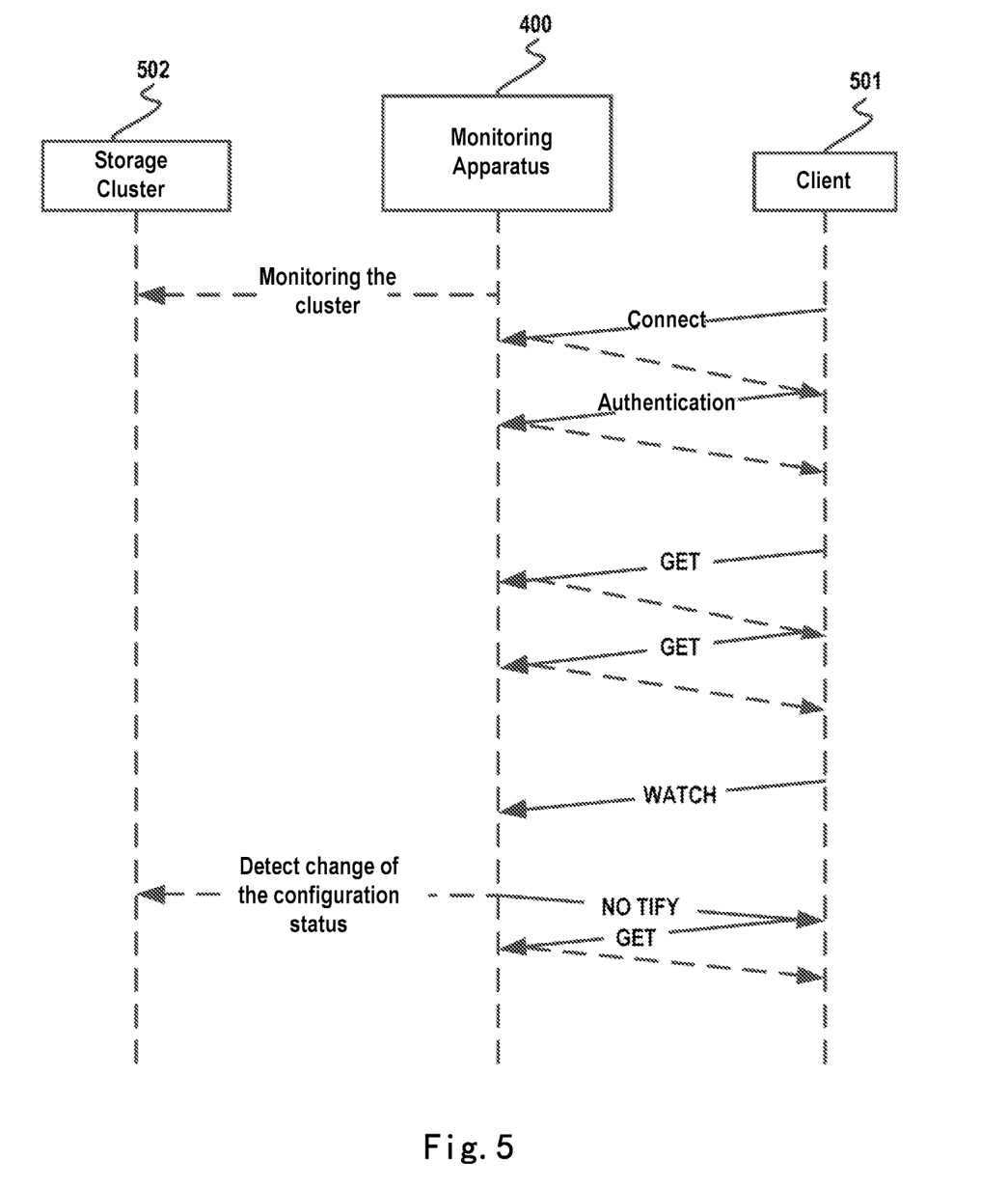
FIG. 5 illustrates a process of presenting a storage cluster status using the apparatus in FIG. 4.

FIG. 5 illustrates a process of presenting a storage cluster status using the apparatus 400 in FIG. 4. As shown in FIG. 5, when being connected to the monitoring apparatus 400, a client 501 needs to be first authenticated. Only when the authentication passes, can the client 501 be successfully connected to the monitoring apparatus 400. When the client 501 sends a GET request to the monitoring apparatus 400, configuration status information of a corresponding target node in a storage cluster 502 will be queried, and the storage cluster 502 will return the configuration status information of the requested target node to the client 501. When the client 501 sends a WATCH request to the monitoring apparatus 400, the monitoring apparatus 400 will detect whether a configuration status of the target node in the storage cluster 502 is changed. When the monitoring apparatus 400 detects a change of the configuration status of the target node in the storage cluster 502, the monitoring apparatus 400 will transmit a NOTIFY message to the client 501, thereby presenting the changed configuration status information to the user.

Moreover, the units included in the apparatus 400 may be implemented by various manners, including software, hardware, firmware or a random combination thereof. For example, in some embodiments, the apparatus may be implemented by software and/or firmware. Alternatively or additionally, the apparatus 400 may be implemented partially or completely based on hardware for example, one or more units in the apparatus 500 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of presenting a storage cluster status, comprising:
   in response to a request for monitoring a first target node in a storage cluster, monitoring whether a configuration status of the first target node is changed at least in part by monitoring whether the first target node fails;
   in response to the configuration status of the first target node being changed, presenting changed configuration status information of the first target node to the user; and in response to failure of the first target node:
  presenting failure status information of the first node to the user, and
  failing over an active system where the first target node is located to a backup system.

2. The method according to claim 1, further comprising:
in response to the configuration status of the first target node being changed, storing the changed configuration status information of the first target node in a configuration database.

3. The method according to claim 2, wherein the configuration database is configured to store the configuration status information of all nodes in the storage cluster.

4. The method according to claim 3, wherein the configuration status information stored in the configuration database is organized in a tree-like structure.

5. The method according to claim 1, further comprising:
in response to a request for querying a second target node in the storage cluster, returning configuration status information of the second target node; and
presenting the configuration status information of the second target node to the user.

6. An apparatus for presenting a storage cluster status, comprising:
  a processor coupled to a computer readable memory;
  a monitoring unit configured to, in response to a request for monitoring a first target node in a storage cluster, monitor whether a configuration status of the first target node is changed at least in part by monitoring whether the first target node fails;
  a displaying unit configured to:
in response to the configuration status of the first target node being changed, present changed configuration status information of the first target node to the user, and
  in response to failure of the first target node, present failure status information of the first node to the user; and
  a failover unit configured to, in response to failure of the first target node, fail over an active system where the first target node is located to a backup system.

7. The apparatus according to claim 6, further comprising:
a configuration database configured to, in response to the configuration status of the first target node being changed, store the changed configuration status information of the first target node.

8. The apparatus according to claim 7, wherein the configuration database is configured to store the configuration status information of all nodes in the storage cluster.

9. The apparatus according to claim 8, wherein the configuration status information stored in the configuration database is organized in a tree-like structure.

10. The apparatus according to claim 6, further comprising:
  a query unit configured to in response to a request for querying a second target node in the storage cluster, return configuration status information of the second target node; and
  the displaying unit is further configured to present the configuration status information of the second target node to the user.

11. A computer program product for presenting a storage cluster status, the computer program product comprising:
  a non-transitory computer readable medium encoded with computer-executable code, wherein the code is configured to enable the execution of:
    in response to a request for monitoring a first target node in a storage cluster, monitoring whether a configuration status of the first target node is changed at least in part by monitoring whether the first target node fails;
    in response to the configuration status of the first target node being changed, presenting changed configuration status information of the first target node to the user; and
    in response to failure of the first target node:
      presenting failure status information of the first node to the user, and
      failing over an active system where the first target node is located to a backup system.

12. The computer program product according to claim 11, wherein the code is further configured to enable the execution of:
  in response to the configuration status of the first target node being changed, storing the changed configuration status information of the first target node in a configuration database.

13. The computer program product according to claim 12, wherein the configuration database is configured to store the configuration status information of all nodes in the storage cluster.

14. The computer program product according to claim 13, wherein the configuration status information stored in the configuration database is organized in a tree-like structure.

15. The computer program product according to claim 11, wherein the code is further configured to enable the execution of:
  in response to a request for querying a second target node in the storage cluster, returning configuration status information of the second target node; and
  presenting the configuration status information of the second target node to the user.

16. A method of presenting a storage cluster status, comprising:
  in response to a request for monitoring a first target node in a storage cluster, monitoring whether a configuration status of the first target node is changed;
  in response to the configuration status of the first target node being changed, presenting changed configuration status information of the first target node to the user;
  wherein presenting changed information of the first target node to the user further includes transmitting a notify message from a monitoring apparatus to a client in response to the monitoring apparatus detecting the configuration status of the first node being changed; and
  wherein detecting by the monitoring apparatus that the configuration status of the first node is changed is performed by the monitoring apparatus in response to a watch request from the client.

* * * * *